United States Patent [19]

Englebert

[11] Patent Number: 4,923,052

[45] Date of Patent: May 8, 1990

[54] MECHANICAL-FLUID-RETENTION PLATFORM

[76] Inventor: Gary L. Englebert, 172 Benders Church Rd., Biglerville, Pa. 17307

[21] Appl. No.: 316,077

[22] Filed: Feb. 27, 1989

[51] Int. Cl.⁵ .................................. F16N 31/02
[52] U.S. Cl. ................................. 184/106; 184/1.5; 220/1 C
[58] Field of Search .............. 184/1.5, 106; 220/1 C; 141/98, 86

[56] References Cited

U.S. PATENT DOCUMENTS

| | | | |
|---|---|---|---|
| 1,568,830 | 1/1926 | Gunderson | 184/1.5 |
| 3,062,323 | 11/1962 | Oganovic . | |
| 3,228,491 | 1/1966 | Gatsos . | |
| 3,358,719 | 12/1967 | Minard | 141/86 |
| 3,565,214 | 2/1971 | Koonce . | |
| 4,640,431 | 2/1987 | Harrison | 184/106 |
| 4,826,030 | 5/1989 | Valley | 220/1 C |

Primary Examiner—Ira S. Lazarus
Assistant Examiner—Alan Cariaso

[57] ABSTRACT

A platform structure adapted to be positioned on a floor surface to catch and retain mechnical fluid (oil. gasoline, grease, sludge, etc.) that might otherwise drip onto the floor, causing unsightly oil spots or a dangerous slippery floor surface. The platform comprises a rigid panel composed of durable plastic that is resistant to both mechanical fluids and moisture. Additionally, a removable liner, formed of a porous sponge material is located on the panel upper face. The liner is replaceable or reusable, e.g. after it has become substantially mechanical fluid-filled. The linear is retained by a circumscribed vertical perpendicular wall at the edge of the panel. The wall is flanged at the top to form a horizontal rim which overhangs (and is parallel to) the panel. Both panel and liner are supported above the floor surface and underneath the engine or transmission of a motorized vehicle by four downwardly-extending legs, adjustable by a threaded element at the bottom of each leg. A handle is affixed to one side edge of the platform structure to facilitate easy carrying of the platform in "suitcase" fashion from one site to another.

1 Claim, 1 Drawing Sheet

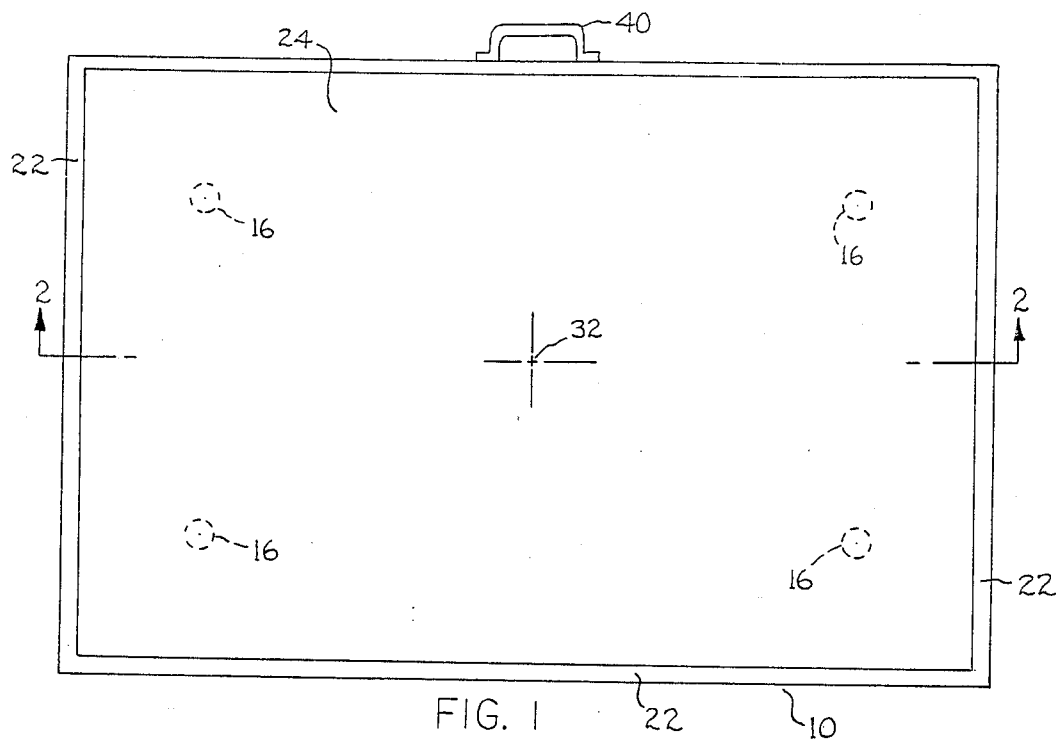
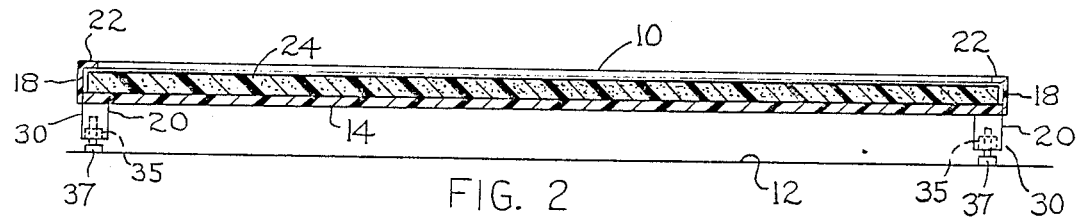

MECHANICAL-FLUID-RETENTION PLATFORM

BACKGROUND AND SUMMARY OF THE INVENTION

This invention relates to a platform structure that can be positioned on any floor surface to catch and retain mechanical fluids (such as oil, gasoline, grease, etc.) that might drip from the engine or transmission of a motorized vehicle. The oil, gasoline, etc. are thereby prevented from forming unsightly oily spots on, e.g. a garage floor surface. Also, the floor is kept dry and free from slippery oily accumulations that a person might inadvertantly step into, causing possible injury or the tracking of oily fluids from the person's shoes into the home.

The invention avoids the need to use cloths, brooms or mops for removing mechanical fluid accumulations from floor surfaces. The person's brooms or mops can thereby be kept in clean condition instead of becoming coated with ruinous oily fluids or sludge particles.

Some roughly similar oil retention structures have already been patented, although to my knowledge none are available in stores. U.S. Pat. No. 3,062,323 to P. Oganovic shows a mat structure that includes a board 10 formed of crushed wood fibers pressed together with a suitable binding agent. A metal band 11 surrounds the board, apparently to prevent oil from seeping out of the board edges. The upper face of board 10 has a film of cement 14 for adhesive securement of an oil-absorbing chemical 15. One disadvantage of the Oganovic structure is the fact that the structure rests directly on the garage floor; water, snow and dirt accumulations can work into the fibrous interior of the board to attack the binding agent and cause the board to fragment or crumble into an unusable condition. Also, water absorption into the board interior reduces the pore volume that would otherwise be available for oil absorption purposes.

U.S. Pat. No. 3,228,491 to S. Gatsos shows an oil-catching mat structure formed of corrugated fiberboard or paperboard. As seen in FIG. 5 of the patent, the mat 10 comprises two flat sheets 11 and 12, and an intervening corrugated sheet 13. Holes 17 are formed in sheet 11 to admit oil into the mat interior spaces; also, a moisture-proof coating is formed on the lower face of sheet 12. The Gatsos mat structure is elevated above the garage floor by means of foot structures 19. However, the foot structures are formed out of the same corrugated paperboard that is used to make the mat structure 10. With each foot structure 19 in the FIG. 4 operating position the lower edge areas of the foot structures are subject to attack by water or snow accumulations on the garage floor surface. Such water/snow accumulations would quickly penetrate face areas 11 of the foot structure and also the edge areas of the foot structure. Capillary action or wick action would produce an upward flow of water along foot structure 19, leading to early failure of the mat support system.

U.S. Pat. No. 3,565,214 shows an oil-retaining mat structure formed out of a folded sheet of paper felt. The mat structure rests directly on the garage floor where it is subject to attack by water accumulations on the floor surface.

My proposed mechanical-fluid-retention platform comprises a flat rigid rectangular panel completely walled (above and around its edge) and flanged at the top of the wall forming a rim that overhangs the panel. The panel is elevated above the floor surface by four or more legs. The individual legs are adjustable vertically, such that the panel is supported in a wobble-free manner in spite of unevenness or slope in the floor surface. The platform with its panel, wall, rim and legs is composed of durable plastic that is resistant to both mechanical fluids and moisture. The wall, rim and legs may be molded together with the panel to form a one-piece platform structure.

The platform includes a flat flexible liner formed of a material capable of absorbing mechanical fluids. e.g. an open celled porous sponge material. The liner is removably positioned on the upper surface of the aforementioned rigid panel, whereby after the liner has been saturated to a point approaching its oily-fluid-retention capacity, the liner can be removed and replaced with a new liner or washed with an oil-removing agent (if it is desired to reuse the liner).

THE DRAWINGS

FIG. 1 is a top plan view of a platform structure embodying the present invention.

FIG. 2 is a sectional view taken on line 2—2 in FIG. 1.

DESCRIPTION OF A PREFERRED EMBODIMENT OF THE INVENTION

The drawings show a platform structure 10 adapted for disposition underneath a motorized vehicle for trapping mechanical fluids (oil, gasoline, grease, etc.) that might drip from the vehicle engine or transmission. Normally platform structure 10 will be disposed on a garage floor surface 12, although it could be disposed on any surface where the oily fluid catching-trapping function is required.

The platform structure 10 includes a flat rigid panel 14. The panel is completely walled (around and above its edge) and horizontally flanged at the top of the wall so that the rim 22 overhangs the panel. This construction accommodates and retains a liner.

As seen in FIG. 1, the rim 22 completely encompasses panel 14. FIG. 2 shows the panel-wall-rim construction as having a J-shaped cross section that includes a horizontal panel 14, a vertical and perpendicular wall 18, and a horizontal rim 22 spaced above the upper face of panel 14. FIG. 2 also shows rim 22 slightly overhanging a liner 24 and underlying panel 14. Extending downwardly from panel 14 at each of its corners is a leg base 20. The panel 14, wall 18, rim 22 and the four leg bases 20 are preferably composed of durable plastic that is resistant to both mechanical fluids and moisture.

Conceivably panel 14, walls 18, rim 22 and legs 20 could be formed as a unitary one piece plastic molding. However complex tooling would be necessary. Therefore, it might be more economical to form the various components separately and then attach them together with suitable adhesives. For example, each leg base 20 might be formed of square or round bar stock, whereas each wall 18 and associated rim wall 22 could be formed from angle cross-sectioned stock. Rigid plastic is the preferred material, although metals (e.g. steel or aluminum) could be used for at least some of the components. Rigidifying reinforcement ribs may be built into panel 14 if found necessary.

A flat flexible liner 24 is removably disposed on the upper face of rigid panel 14. The liner 24 is composed of a flexible porous sponge material capable of absorbing and retaining only fluids therein; it has an appreciable thickness, e.g. at least one inch, whereby it is enabled to absorb and retain appreciable quantitites of oily fluids. Liner 24 is only slightly smaller than panel 14 in the top plan dimension; therefore the liner 24 can be manipulatably inserted into the panel-wall-rim J-shaped structure, where it rests on panel 14. The edge of liner 24 underlies rim 22. Rim 22 has a relatively small cross-sectional width dimensions (FIG. 2), such that the flexible liner 24 can be inserted into the panel-wall-rim J-shaped structure without undue skill or effort. Wall 18 and rim 22 retain liner 24 in place on the upper face of rigid panel 14. In the event that the platform needs to be carried from place to place, some positive fastener mechanisms may be used to hold flexible liner 24 on panel 14. For example, clips, screws or adhesive patches 16 may be mounted on panel 14 inwardly from the panel corners to engage and releasably retain liner 24.

The platform structure 10 is elevated above floor surface 12 by four downwardly-extending leg structures 30 at each corner of panel 14. An additional leg structure (not shown) could be extended downwardly at the central axis 32 of panel 14 (shown in FIG. 1), to provide additional support for the platform structure 10.

Each leg structure 10 comprises a solid or hollow plastic leg base 20 having a square nut 35 embedded therein.

Cooperating with each nut 35 is an elongated foot element 37 having an elongated threaded cylindrical shank area threaded into nut 35. By threading element 37 upwardly or downwardly in nut 35 it is possible to effectively vary the length of the associated leg structure 30. The individual foot elements 37 can be selectively adjusted to keep the platform horizontal and wobble-free in spite of unevenness or slope of floor 12.

The platform structure 10 is positioned on floor surface 12 beneath the engine-transmission area of a motorized vehicle, whereby any mechanical fluids dripping from the engine or transmission impinge on the upper face of liner 24. The oily fluids are absorbed into the pores within liner 24. Wall 18 surrounds liner 24 to preclude liquid escape from the liner. After liner 24 has become saturated with oily fluids, liner 24 is removed and replaced with another similar liner. Alternately, the liner 24 can be cleaned with an oily fluid-removing agent to restore it substantially to its original condition for reuse on panel 14.

At times it may be necessary to remove or relocate the platform structure 10 from its designated position on the garage floor, e.g. when it is desired to sweep or hose down the garage floor. A handle structure 40 may be affixed to wall 18 of platform structure 10 to facilitate easy carrying of the platform structure "suitcase" fashion from one site to another. The mechanical fluids are absorbed into the pores of the liner 24 which may be secured with clips or screws 16 to panel 14. Therefore the platform can be lifted on edge without undue concern that oily fluids will drip onto the floor or one's clothing; or that the liner 24 will fall from the upper face of panel 14 onto floor surface 12.

The drawings show one form that the invention can take. Other forms are possible.

I claim:

1. A platform especially adapted for horizontal disposition underneath a motorized vehicle for trapping mechanical fluids, such as oil, gasoline or grease, dripping from the vehicle, comprising:

a rigid flat rectangular panel (14), upstanding walls 18 extending upwardly from the peripheral edges of said rigid panel, and rim-forming flanges (22) extending horizontally and inwardly from the upper edges of said upstanding walls; legs (20 extending vertically downwardly from corner areas of said rectangular panel, whereby the panel can be positioned above the vehicle support floor out of contact with water, snow or dirt that might accumulate on the floor surface; a nut (35) carried on each leg at its lower end, and an elongated foot element (37) having a threaded shank area threaded into each nut, whereby each foot element is vertically adjustable on the associated leg so that the rectangular panel can be supported in a stable horizontal position on uneven floor surfaces without wobble;

a flat rectangular flexible liner (24) removably disposed on the upper face of the rigid panel, said liner being formed of a porous sponge material capable of absorbing and retaining oily fluids therein, said rectangular liner having length and width dimensions that are slightly greater than the corresponding dimensions circumscribed by the inner edges of the rim-forming flanges, whereby the liner is retained on the rigid panel by the rim flanges.

said liner having sufficient flexibility to permit it to be inserted into, or removed from, the space circumscribed by the upstanding wall (18);

said liner (24) having a vertical thickness that is only slightly less than the heights of said upstanding walls (18), such that the liner is thick enough to absorb and retain appreciable quantities of oily liquids;

a carrying handle (40) attached to one of said upstanding walls to facilitate manual carrying of the platform in suitcase fashion;

and a plural number of fastener mechanisms (16) carried on the rigid panel inwardly from its four corners, said fastener mechanisms being adapted to releasably grip the undersurface of the flexible liner, whereby the liner is ensured of remaining on the panel while the platform is being carried from place to place.

* * * * *